(12) United States Patent
Chaubey et al.

(10) Patent No.: US 10,497,369 B2
(45) Date of Patent: Dec. 3, 2019

(54) METHOD AND SYSTEM FOR POWER SAVINGS IN VOICE CONTROL OF A COMPUTING DEVICE

(71) Applicant: QUALCOMM INCORPORATED, San Diego, CA (US)

(72) Inventors: Nishith Chaubey, San Diego, CA (US); Anil Rao, San Diego, CA (US); James Francis Geekie, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 155 days.

(21) Appl. No.: 15/684,742

(22) Filed: Aug. 23, 2017

(65) Prior Publication Data

US 2019/0066666 A1    Feb. 28, 2019

(51) Int. Cl.
*G10L 15/22* (2006.01)
*G10L 15/08* (2006.01)
*G06F 3/16* (2006.01)
*G10L 15/06* (2013.01)

(52) U.S. Cl.
CPC .............. *G10L 15/22* (2013.01); *G06F 3/167* (2013.01); *G10L 15/08* (2013.01); *G10L 15/063* (2013.01); *G10L 2015/088* (2013.01); *G10L 2015/223* (2013.01); *G10L 2015/226* (2013.01)

(58) Field of Classification Search
CPC ....... G10L 15/22; G10L 15/08; G10L 15/063; G10L 2015/088; G10L 2015/223; G10L 2015/226
USPC ........................................................ 704/243
See application file for complete search history.

(56) References Cited

U.S. PATENT DOCUMENTS

| | | | |
|---|---|---|---|
| 5,899,972 A * | 5/1999 | Miyazawa | G10L 15/22 704/249 |
| 2007/0198634 A1 | 8/2007 | Knowles et al. | |
| 2014/0064134 A1 | 3/2014 | Huang et al. | |
| 2014/0204816 A1 | 7/2014 | Ismail et al. | |
| 2015/0350807 A1 | 12/2015 | Andrews et al. | |
| 2016/0014842 A1* | 1/2016 | Brisebois | H04W 76/38 709/224 |
| 2018/0293974 A1* | 10/2018 | Georges | G10L 15/183 |

* cited by examiner

*Primary Examiner* — Bharatkumar S Shah
(74) *Attorney, Agent, or Firm* — Smith Tempel Blaha LLC

(57) ABSTRACT

Methods and systems for controlling a portable computing device ("PCD") are disclosed. In an example method, an always on processor (AoP) of a voice recognition module of the PCD receives a voice command. The AoP determines, without decoding the received voice command, that the received voice command corresponds to a previously determined keyword. The AoP retrieves context data associated with the previously determined keyword. The AoP acts on the voice command using the context data, including in some embodiments automatically triggering a fast dormancy of a communications channel.

18 Claims, 6 Drawing Sheets

METHOD AND SYSTEM FOR POWER SAVINGS IN VOICE CONTROL OF A COMPUTING DEVICE

DESCRIPTION OF THE RELATED ART

Computing devices, including desktop computers, servers, and portable computing devices ("PCDs") are ubiquitous. PCDs for example are becoming necessities for people on personal and professional levels. These devices may include cellular telephones (such as smartphones), portable digital assistants ("PDAs"), portable game consoles, palm-top computers, tablet computers, wearable devices and other portable electronic devices. Such PCDs are increasingly relying on voice control systems and methods, especially smaller wearable PCDs. Additionally, such PCDs are increasingly being relied upon to fetch data, such as through one or more radios which may connect with cellular and/or wireless networks.

As PCDs are required to perform more tasks including increased data gathering or fetching, decreasing power consumption becomes more important to ensure a satisfactory battery life. This is especially true in smaller and/or wearable PCDs which may require many connections to a cellular or wireless network, each connection only needed for relatively brief transmissions or receipts of data. The power needed to maintain these connections may unnecessarily drain the PCD battery. This power drain may be worsened by a voice control system for the PCD which requires decoding of each voice command, such as a voice command that requires the PCD to gather or fetch data from an outside source via a connection through one of the PCD radios.

Accordingly, there is a need for systems and methods for power savings in voice control of PCDs, and especially in voice controls that require the transmission or fetching of data through one of the PCD radios.

SUMMARY OF THE DISCLOSURE

Various embodiments of methods and systems for power savings in voice control of a PCD. In an exemplary embodiment, a method is provided, the method comprising an always on processor (AoP) of a voice recognition module of the PCD receives a voice command. The AoP determines, without decoding the received voice command, that the received voice command corresponds to a previously determined keyword. The method further includes the AoP retrieving context data associated with the previously determined keyword. The AoP acts on the voice command using the context data, including in some embodiments automatically triggering a fast dormancy of a communications channel.

In another embodiment, a computer system is disclosed. The exemplary system comprises a voice recognition (VR) module with an always on processor (AoP). The AoP is configured to receive a voice command and determine, without decoding the received voice command, that the received voice command corresponds to a previously determined keyword. The AoP is further configured to retrieve a context data associated with the previously determined keyword. The AoP is also configured to act on the voice command using the context data, and in some embodiments automatically trigger a fast dormancy of a communications channel.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
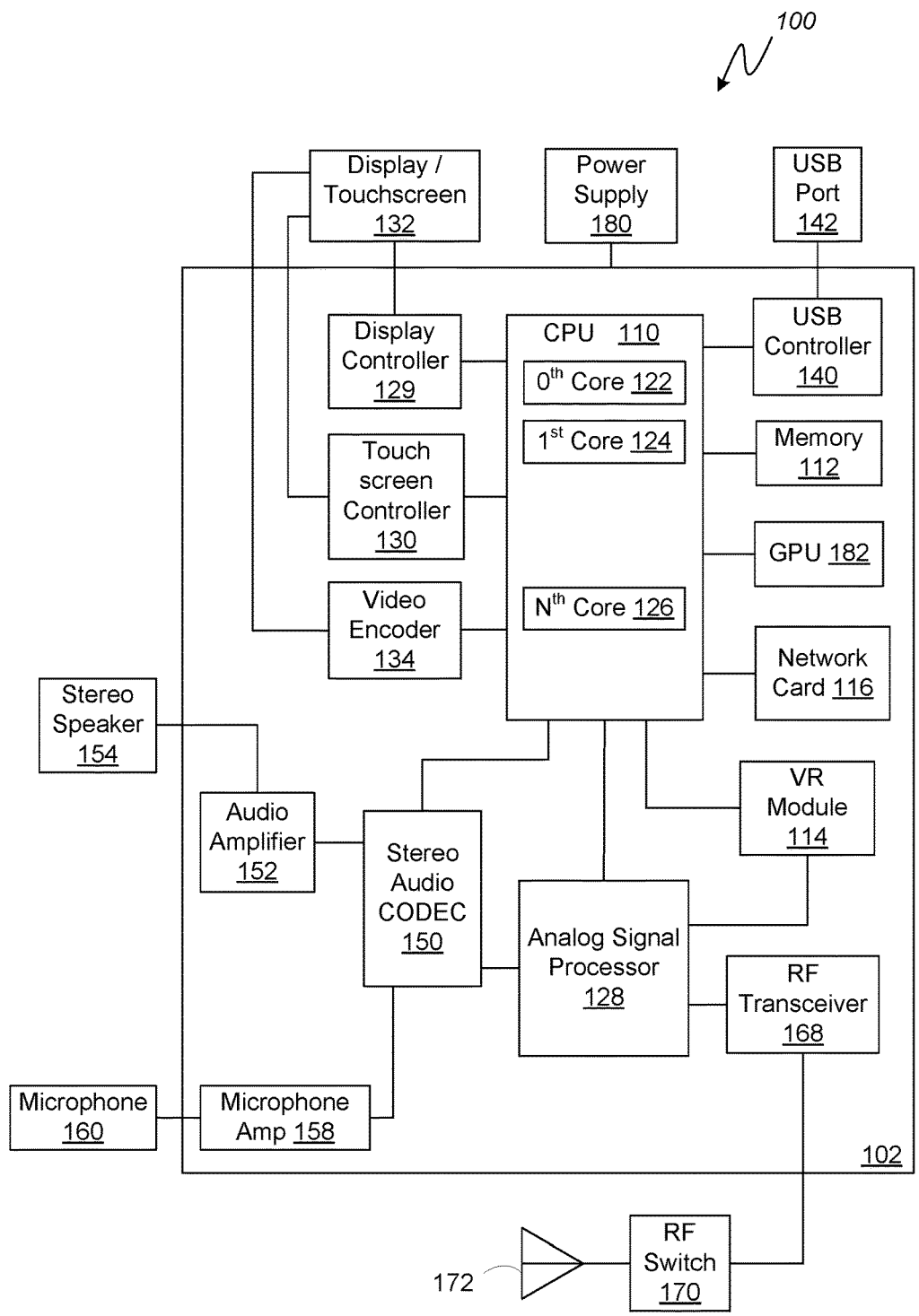
FIG. 1 is a functional block diagram illustrating an example embodiment of a wearable portable computing device (PCD) in which systems and methods for power savings in voice control can be implemented.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system" and the like are intended to refer to a computer-related entity, either hardware, firmware, a combination of hardware and software, software, or software in execution and represent exemplary means for providing the functionality and performing the certain steps in the processes or process flows described in this specification. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)."

In this description, the terms "workload," "process load" and "process workload" are used interchangeably and generally directed toward the processing burden, or percentage of processing burden, associated with a given processing component in a given embodiment, such as when that processing component is executing one or more task or instruction. Further, a "processing component" may be, but is not limited to, a system-on-a-chip ("SoC"), a central processing unit, a graphical processing unit, a core, a main core, a sub-core, a processing area, a hardware engine, a camera, a modem, etc. or any other component residing within, or external to, an integrated circuit within a portable computing device.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a tablet computer, a combination of the aforementioned devices, a laptop computer with a wireless connection, and/or wearable products, among others.

FIG. 1 is a functional block diagram illustrating an example embodiment of a portable computing device (PCD) in which systems and methods for power savings in voice control can be implemented. The exemplary embodiment of the PCD in FIG. 1 is a wearable device, such as a smartwatch. It will be understood that, in other embodiments or implementations, the PCD may be another kind of computing device. It will also be understood that a PCD, including a wearable device, may have more, fewer, or different components that those illustrated in FIG. 1 and/or may have components arranged in a different configuration than that illustrated in FIG. 1.

As shown, the example PCD 100 includes an on-chip system ("SoC") 102 that includes a multi-core central processing unit ("CPU") 110 and an analog signal processor 128 that are coupled together. FIG. 1 also shows that a power supply 180 may be coupled to the SoC 102. The power supply 180 may be a direct current (DC) power supply that provides power to the various components of the PCD 100 that require power. In an embodiment, power supply 180 may be a rechargeable DC battery or a DC power supply that is derived from an alternating current ("AC") to DC transformer that may be connected to an AC power source.

The CPU 110 may comprise multiple cores including a zeroth core 122, a first core 124, up to and including, an Nth core 126, or the CPU 110 may be a single-core processing component (not illustrated). Further, instead of a CPU 110, a digital signal processor ("DSP") may also be employed as understood by one of ordinary skill in the art. As will be understood, the cores 122, 122, 126 may be implemented to execute one or more instructions or tasks, such as instructions or tasks of an application being executing by the PCD 100. As will also be understood, such instructions or tasks may instead, or may additionally, be executed by or on one or more additional processing components, such as GPU 182 illustrated in FIG. 1.

In an embodiment, voice recognition may be implemented in the PCD 100, either as the sole method to input commands to control the PCD 100, or as one among multiple methods to input commands to control the PCD 100. In the exemplary embodiment of FIG. 1, the voice recognition capability is illustrated generally with block VR module 114 which will be described more fully below. Although shown as a single component on the SoC 102 for convenience in FIG. 1, the VR module 114 may, in some embodiments, comprise multiple components, one, some, or all of which may not be located on the SoC 102. It is not necessary in the present disclosure for the VR module 114 to be a component illustrated in FIG. 1, and in some embodiments the VR module 114 may be implemented in software, such as executable instructions, code, and/or parameters, stored in a memory 112.

As illustrated in FIG. 1, a display controller 129 and a touch screen controller 130 may be coupled to the CPU 110. In the exemplary embodiment, a touch screen display 132, external to the SoC 102, is coupled to the display controller 131 and the touch screen controller 130 provides another mechanism for a user to input commands to control PCD 100. Again, although shown in FIG. 1 as single components located on the SoC 102, both the display controller 131 or touch screen controller 130 may comprise multiple components, one or more of which may not be located on the SoC 102 in some embodiments.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder. The video encoder 134 is coupled to the CPU 110. A video amplifier (not shown) may also be implemented and coupled to the video encoder 134 and the touch screen display 132.

As depicted in FIG. 1, a universal serial bus ("USB") controller 140 is coupled to the CPU 110. In addition, a USB port 142 is coupled to the USB controller 140. In other embodiments no USB port 142/USP controller 140 may be implemented and/or a different type of port/controller may be used to allow external devices to be connected to the PCD 100 and/or to allow recharging of power supply 180.

A memory 112 may also be coupled to the CPU 110. As further illustrated in FIG. 1, a stereo audio CODEC 150 may be coupled to the analog signal processor 128. Moreover, an audio amplifier 152 may be coupled to the stereo audio CODEC 150. In an exemplary aspect, a stereo speaker 154 is coupled to the audio amplifier 152. FIG. 1 shows that a microphone amplifier 158 may also be coupled to the stereo audio CODEC 150. Additionally, a microphone 160 may be coupled to the microphone amplifier 158 which may be used to capture voice commands as inputs to the PCD 100.

FIG. 1 further indicates that a radio frequency ("RF") transceiver 168 may be coupled to the analog signal processor 128. An RF switch 170 may be coupled to the RF transceiver 168 and an RF antenna 172. FIG. 1 also shows that a power supply 180, for example a DC battery, is coupled to the SoC 102. In an embodiment the power supply may be coupled to the SoC 102 through a power management integrated circuit (PMIC) (not illustrated).

PCD 100 may also include a network card 116 that may be used to access a data network, e.g., a local area network, a personal area network, or any other network. The network card 116 may be a Bluetooth network card, a WiFi network card, a personal area network (PAN) card, a personal area network ultra-low-power technology (PeANUT) network card, a television/cable/satellite tuner, or any other network card known in the art. Further, the network card 116 may be incorporated into a chip, i.e., the network card 116 may be a full solution in a chip, and may not be a separate network card 116.

In the embodiment illustrated in FIG. 1, the touch screen display 132, the USB port 142, the stereo speaker 154, the microphone 160, t the RF switch 170, the RF antenna 172, and the power supply 180 are external to the SoC 102. In other embodiments additional components illustrated in FIG. 1 may be external to the SoC 102 and/or one or more of the above listed components may be internal to the SoC 102.

In a particular aspect, one or more of the method steps described herein may be implemented by executable instructions, code, and/or parameters stored in a memory 112 or in other components discussed herein. In an embodiment, the instructions may form, or may form a portion of the VR module 114 and such instructions may be executed by the CPU 110, the analog signal processor 128, another portion of the VR module 114, or another processor, to perform the methods described herein. Further, the CPU 110, VR module 114, analog signal processor 128, the memory 112, the instructions stored therein, or a combination thereof may serve as a means for performing one or more of the method steps described herein.

As noted, decreasing power consumption in user equipment (UE) computing devices is important to ensure a satisfactory battery life. This is especially important where the UE is a wearable device such as a wearable PCD 100. This need for decreased power consumption comes at a time when power intensive voice recognition systems are increasingly being used to control UE computing devices (especially wearable devices) and when UE computing devices are increasingly being relied upon to fetch data, such as through one or more radios which may connect with cellular and/or wireless networks.

Typically, when data is communicated between the UE and an outside network, the UE sends a request for resources to establish a connection. Once the data payload is sent or received, inactivity timers may be set at the network, which facilitate channel switching at the UE. In one example, upon expiration of the timers, the UE can transition from dedicated channel (DCH) to Forward Access Channel (FACH) to IDLE state. Often, the inactivity timers are set to relatively long values for quality of service purposes to ensure that relatively larger computing devices such as tablet computers, PDAs, etc., that have longer battery life and/or which may download relatively large amounts of data have the needed connections for multiple data transfers. However, for smaller UE such as wearable devices with smaller batteries and/or shorter battery life, or UEs which may typically have smaller data transmission, such inactivity timers may result in the unnecessary maintenance of communication channels and the associated power drain of maintaining the channel.

To avoid the power drain from the unnecessary maintenance of communication channels, the UE can perform fast dormancy (FD) to initiate direct transition from DCH to IDLE or FACH to IDLE, before a network inactivity timer expires. This FD feature reduces power consumption in the UE, by transitioning the UE to the IDLE mode and releasing the connection as quickly as possible. However, if more data is expected or needed after the UE releases the connection, then the connection needs to be reestablished, which can significantly increase the power consumption and defeat the purpose of fast dormancy.

Adding to, or in the alternative to, the above power drains from unnecessary maintenance of communication channels and/or closing communication channels too quickly, is the power drain to a UE when a user is using voice commands to control the UE. Typical voice recognition systems and methods require decoding of the voice command, which includes waking up various decoding processors and logic for each voice command received. In the context of data communications, a voice command received by the UE may require waking up various voice recognition processors and/or logic to decode the voice command, waking up various radios/network cards/etc. in order to determine the proper mechanism for the data communication, establishing the communication channel, and making various determinations whether to maintain or close the communication channel, etc.

It has been determined that using heuristics to identify keywords such as "last voice commands"—i.e. voice commands for which no additional voice commands are expected to follow—and then allowing action on these keywords or "last voice commands" without requiring the full voice recognition decoding/processing/etc. can result in significant power savings. These power savings are especially significant were the UE is a wearable device such as exemplary PCD 100.

When these keywords or "last voice commands" are associated with data communications to or from the UE, additional power savings may be seen from storing context data with the keyword/"last voice command." This context data may be used when acting on/processing the keyword/ "last voice command" without the need to for the power consumption from full voice recognition decoding/processing/etc.

In a basic exemplary embodiment, the keyword may be a "last voice command" for a data communication where it has been determined that no further voice command will follow—i.e. that the communication channel can be closed after the "last voice command" is executed without fear of needing to open a new communication channel in response to further voice commands. In this exemplary embodiment, the context data may include a fast dormancy command such that the UE automatically closes the communication channel after the data transfer. As discussed below, additional context data may allow for even more flexibility in acting on a received keyword voice commands and/or "last voice commands." Thus, the present systems and methods provide a cost effective ability to either realize power savings or enhance power savings when providing voice control of a UE, and especially voice control of a wearable UE such as PCD 100.

The system and methods for power savings in voice control of a PCD may be implemented in hardware or software. If implemented in hardware, the systems, or portions of the systems can include any, or a combination of, the following technologies, which are all well known in the art: sensors, discrete electronic components, integrated circuits, application-specific integrated circuits having appropriately configured semiconductor devices and resistive elements, etc. Any of these hardware devices, whether acting alone or in combination with other devices, or other components such as a memory, may also form or comprise components or means for performing various operations or steps of the disclosed methods.

Figure 2:
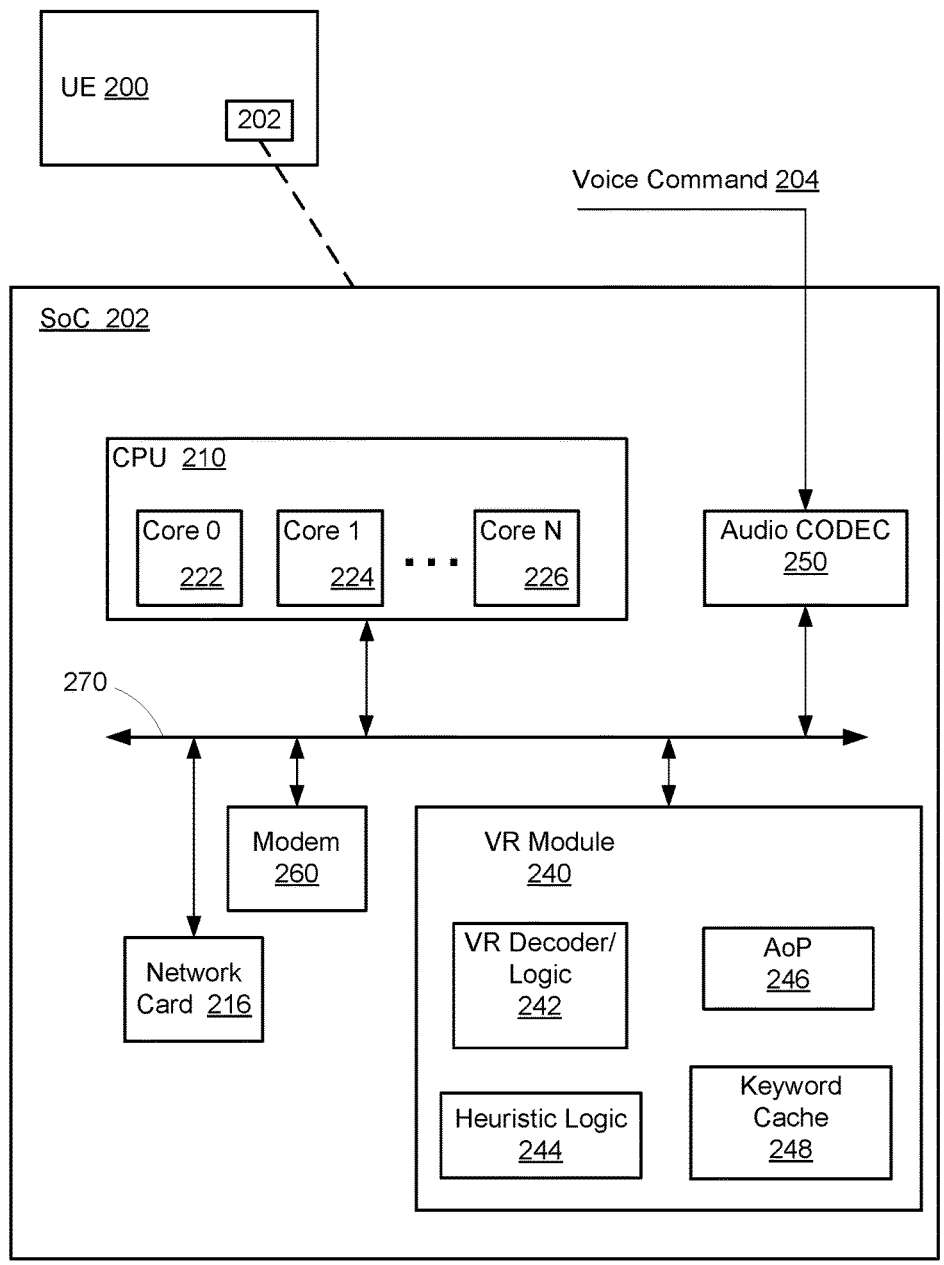
FIG. 2 is a block diagram showing exemplary components of a system on a chip (SoC) that may be used to implement methods for power savings in voice control of a PCD, such as the PCD of FIG. 1.

When a system or method described herein is implemented, or partially implemented, in software, the software portion can be used to perform the methods described herein. The software and data used in representing various elements can be stored in a memory and executed by a suitable instruction execution system (e.g. a microprocessor). The software may comprise an ordered listing of executable instructions for implementing logical functions, and can be embodied in any "processor-readable medium" for use by or in connection with an instruction execution system, apparatus, or device, such as a single or multiple-core processor or processor-containing system. Such systems will generally access the instructions from the instruction execution system, apparatus, or device and execute the instructions FIG. 2 is a block diagram showing exemplary components in an SoC 202 that may be implemented in a UE 200 to allow power savings in voice control of the UE 200. UE 200 may be any computing device such as wearable PCD 100 illustrated in FIG. 1 and SoC 202 may be the SoC 102 illustrated in FIG. 1. FIG. 2 is for illustrative purposes and shows an exemplary arrangement of certain hardware components of the SoC 202 of exemplary UE 200, the hardware components depicted in block form and electrically coupled to each other via a communication path such an interconnect or bus 270.

Bus 270 may include multiple communication paths via one or more wired or wireless connections. Depending on the implementation, bus 270 may include additional elements, which are omitted for simplicity, such as controllers, drivers, repeaters, and receivers, to enable communications. Further, bus 270 may include address, control, and/or data connections to enable appropriate communications among the various components illustrated in FIG. 2 and/or additional components of the SoC 202 and/or UE 200 if desired. In an embodiment, bus 270 may comprise a network on chip (NOC) bus.

As illustrated in FIG. 2, the SoC 202 may include multiple processors or cores, including Core 0 222, Core 1 224, and Core N 226 (collectively Cores 222-226). Although three Cores 222-226 are illustrated, in other embodiments the SoC 202 may have more or fewer Cores 222-226 and/or the Cores 222-226 may be arranged differently than illustrated in FIG. 2. Additionally, the SoC 202 may have a different architecture for the processing components than illustrated in FIG. 2, such as a "big—little" architecture with each of Cores 222-226 comprising two separate processing components of different sizes. The present disclosure is equally applicable to all such architecture variations.

Although not illustrated in FIG. 2, the SoC 202 may also comprise a separate GPU for processing or executing graphics-related workloads, such as rendering graphical information to a user display (not shown), similar to that illustrated for SoC 102 of FIG. 1. Similarly, the SoC 202 may include a video encoder (not shown) for encoding or decoding video files. The SoC 202 may also include a separate audio CODEC 250 for encoding or decoding audio files. SoC 202 may also include one or more components to allow communications between the UE 200 and other computer devices and systems. Such communication components may include modem 260 and/or wide area LAN (WLAN) Network Card 216.

SoC 202 may also include one or more subsystems to support the components listed above and/or to perform other functionality for the SoC 202 or UE 200. As will be understood, these subsystems may include various components or logic configured to work in conjunction with or to work independently of the above-identified components of SoC 202. For example, in an embodiment a subsystem may comprise a low-power audio subsystem (LPASS) for handling audio data for the SoC 202.

Finally, in the embodiment illustrated in FIG. 2, the SoC 202 includes a voice recognition module VR Module 240. VR Module 240 allows for processing of voice commands received from a user of UE 200, such as Voice Command 204 illustrated in FIG. 2 as being received by Audio Codec 250. The exemplary VR Module 240 may include a voice recognition decoder and/or logic to allow for the decoding and understanding of Voice Command 204 (collectively illustrated as VR Decoder/Logic 242 in FIG. 2 for ease of understanding). As will be understood by one skilled in the art, VR Decoder/Logic 242 may comprise various voice recognition hardware and/or software components to allow Voice Command 204 to be decoded and understood by UE 200 and/or SoC 102. Such components may include one or more processing components, memory components, tables, instructions, algorithms, etc., in various configurations. All such various components and methods for accomplishing voice recognition are within the scope of this disclosure and are represented by block VR Decoder/Logic 242 for simplicity.

VR Module 240 also includes logic for performing heuristic analysis represented in FIG. 2 by block Heuristic Logic 244. Heuristic Logic 244 may be implemented in hardware, software, or a combination of hardware and software. Additionally in some embodiments Heuristic Logic 244 may not be a separate component of VR Module 240, but instead may be a part of another component, such as VR Decoder/Logic 242. Heuristic Logic 244 allows SoC 102 to identify various Voice Command 204 "keywords" for which complete voice recognition/decoding may be bypassed, or for which quick action may be taken without the need to wake up various other components of SoC 202 such as a network card 216, modem 260, etc., as discussed below. An exemplary operation of Heuristic Logic 244 is described below in connection with FIG. 5.

Returning to FIG. 2, the illustrated embodiment of the VR Module 240 of SoC 202 may also include a memory to store "keywords" which may be in the form of waveforms or tags. This "keyword" memory is illustrated in FIG. 2 as Keyword Cache 248 and may be any desired form of volatile or non-volatile memory. The stored "keywords" may be the "keywords" identified by Heuristic Logic 244 and/or may include additional "keywords" such as Voice Commands 204 used to wake up the full voice recognition processes. Additionally, other data may be stored in Keyword Cache 248 if desired. For example, in an embodiment various context data for the "keywords" may also be stored in Keyword Cache 248 in association with the applicable "keyword." This context data may also be determined and/or generated by Heuristic Logic 244 in an embodiment, or may be otherwise determined or generated.

In the illustrated embodiment Keyword Cache 248 is shown as a separate component of VR Module 240. In other implementations, Keyword Cache 248 may not be a separate component but may instead be part of another component of VR Module 240. In yet other embodiments, Keyword Cache 248 may not be located in a physically separate VR Module 240 at all, but may instead be located (or a part of a component located) anywhere in the SoC 202, or UE 200 (e.g. may be "off-chip" and external to the SoC 202).

VR Module 240 also includes one or more Always On Processors illustrated as AoP 246. AoP 246 are one or more processors that are "always on" and available for identification of received "keywords." AoP 246 do not perform a full decode of a received "keyword" Voice Command 204. Instead one or more AoP 246 may generally identify the waveform of received "keywords," such as by matching a waveform of a received Voice Command with a waveform/tag stored in Keyword Cache 248.

In an embodiment, if the received Voice Command 204 identified by AoP 246 as a "keyword" for which full decoding is not necessary, then AoP 246 (either acting alone or in conjunction with other components, logic, etc., of VR Module 240 or SoC 202) may bypass full voice recognition for the Voice Command 204—e.g. may not wake up the various components, processors, etc. of VR. Decoder/Logic 242. Instead, AoP 246 may cause action to be taken on the Voice Command 204 "keyword" without full voice recognition. In some implementations, the particular action taken as a result of identifying the "keyword" may be dictated by context data stored in Keyword Cache 248 in association with the "keyword" as described below.

Figure 3:
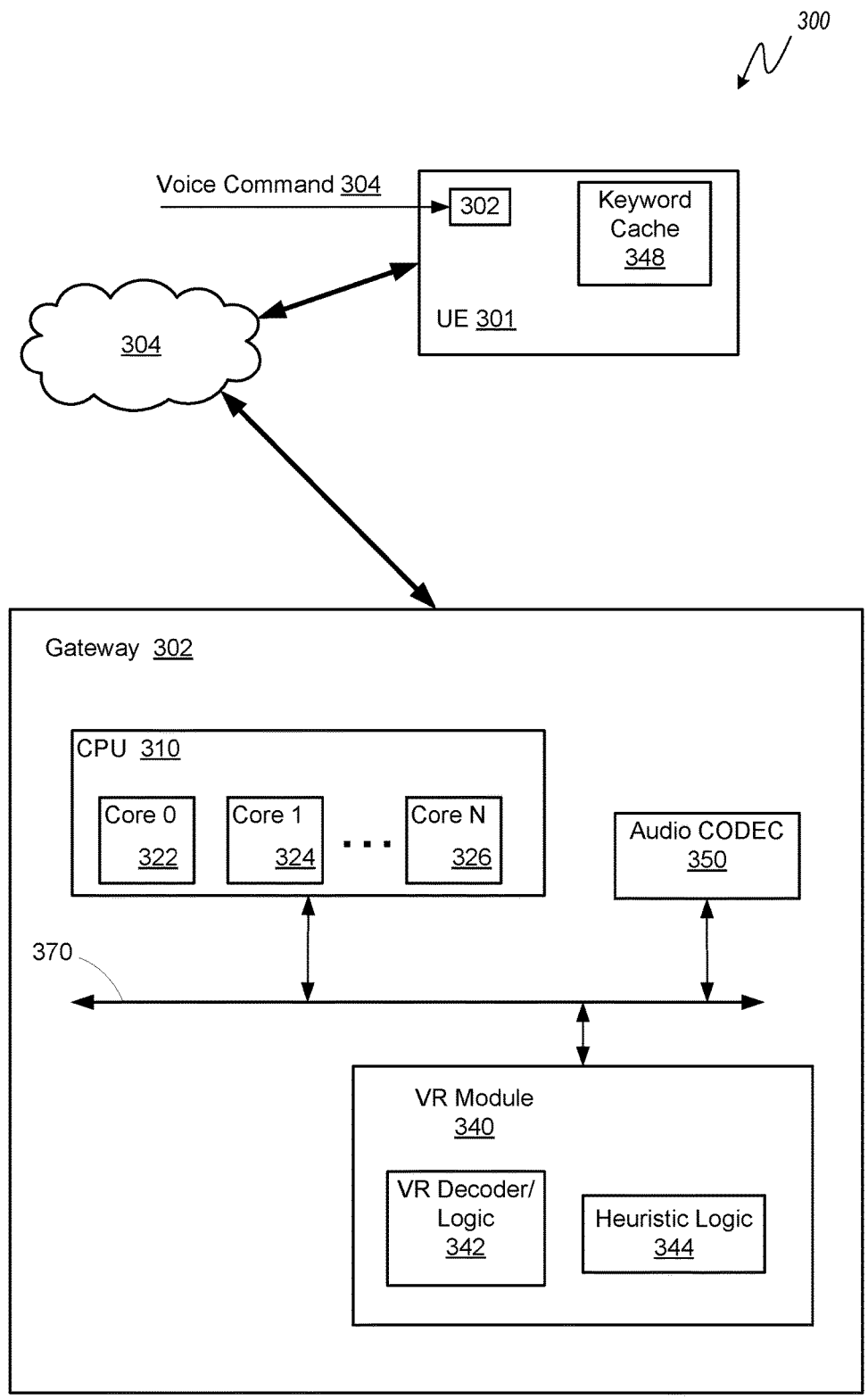
FIG. 3 is a block diagram showing another embodiment of a system that may be used to implement methods for power savings in voice control in a PCD, such as the PCD of FIG. 1.

Turning to FIG. 3, an alternative embodiment of a system 300 that may be used to implement methods for power savings in voice control in a PCD is shown. FIG. 3 is for illustrative purposes, and shows an exemplary arrangement of a system 300 with an exemplary UE 301 in communication with a remote server shown as Gateway 302, such as through the Internet 304. In an embodiment, Gateway 302 may be cloud-based and may comprise one or more servers that may or may not be in the same physical location. Exemplarily UE 301 contains an SoC 302 which may be similar to SoC 102 of FIG. 1 or SoC 202 of FIG. 2.

As will be appreciated, FIG. 3. only illustrates some of the aspects of Gateway 302, and Gateway 302 will include additional components, hardware, software, memory, buffers, etc. not illustrated in FIG. 3. In the illustrated aspects, Gateway 302 may comprise one or more servers comprising one or more CPUs 310. Each CPU 310 may comprise one or more cores, illustrated as Core 0 322, Core 1 324, and Core N 326. More or fewer cores may be implemented in different embodiments. Gateway 302 also includes an Audio CODEC 350 and VR Module 340 electrically coupled to each other via a communication path such as interconnect or bus 370. Bus 370 may include multiple communication paths via one or more wired or wireless connections. Depending on the implementation, bus 370 may include additional elements, which are omitted for simplicity, such as controllers, drivers, repeaters, and receivers, to enable communications. Further, bus 370 may include address, control, and/or data connections to enable appropriate communications among the various components illustrated in FIG. 3 and/or additional components of the Gateway 302.

The Audio CODEC 350, VR Module 340, VR DECORDER/Logic 342, and Heuristic Logic 344 of Gateway 302 are similar to the corresponding components described above with respect to FIG. 2. The primary difference between the embodiment of FIG. 2 and FIG. 3 is that in the system of FIG. 3, at least some of the identification of "keywords" through heuristics is performed by VR Module 340 and/or Heuristic Logic 344 at the Gateway 302 rather than at UE 301. Similarly, in the system 300 of FIG. 3, at least some of the determination or generation of context data associated with one or more "keywords" may also be performed by VR Module 340 and/or Heuristic Logic 344 at the Gateway 302 rather than at UE 301. In the illustrated embodiment of FIG. 3, the "keywords" and associated context data may be communicated to UE 301 and stored locally at UE 301, such as in a Keyword Cache 348. In other embodiments, the "keywords" and/or associated context data may also or instead be stored at the Gateway 302.

Figure 4:
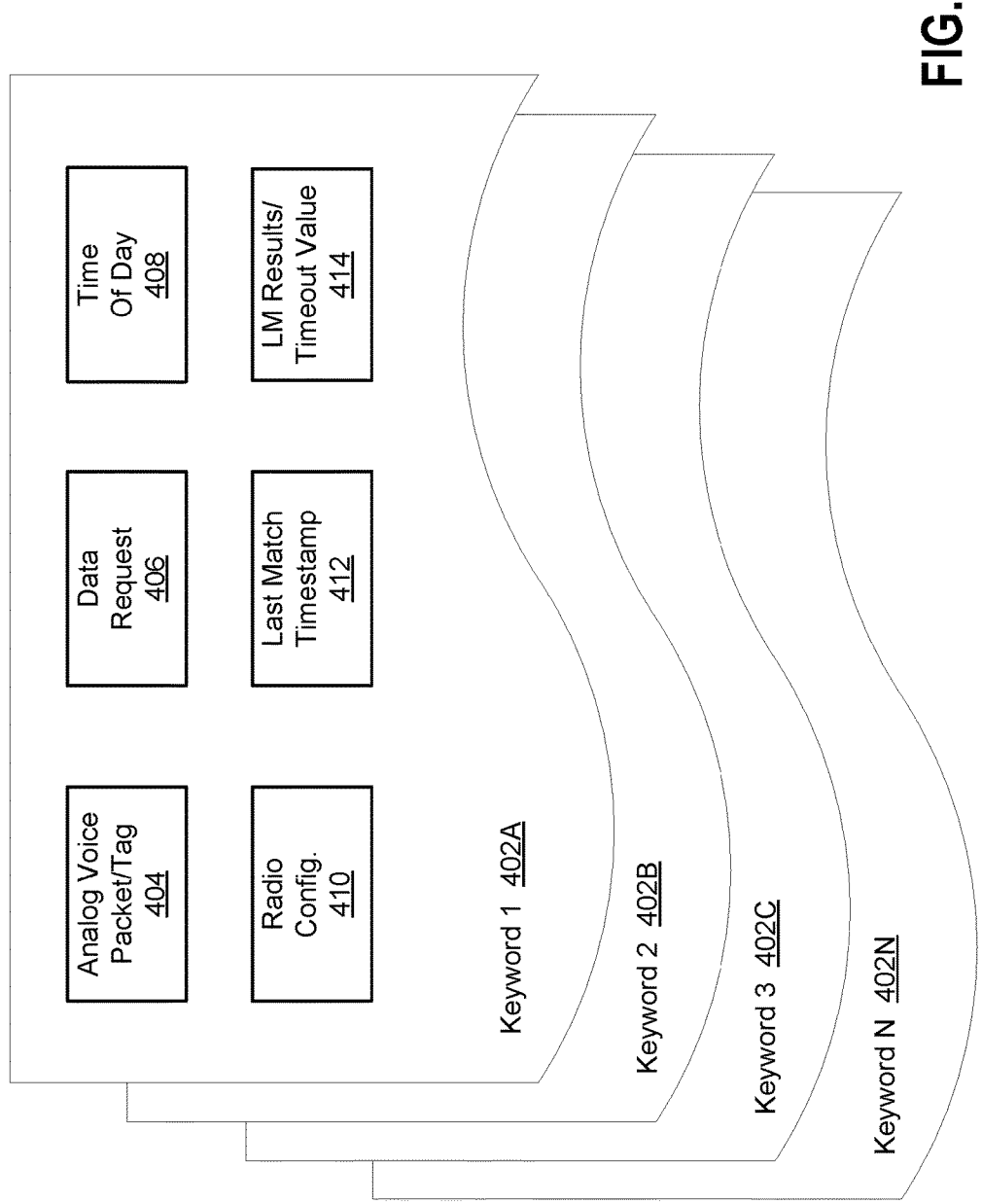
FIG. 4 a block diagram showing exemplary context data that may be stored for a keyword used in the systems of FIG. 2 and/or FIG. 3.

Referring to FIG. 4, illustrated are example "keywords" 402A-402N and associated context data that may be identified and/or stored such as in Keyword Cache 248 (see FIG. 2). As illustrated in FIG. 4, a first "keyword" Keyword 1 402A may include an analog voice packet or tag (Analog Voice Tag 404). As discussed above, when a Voice Command 204 is received at UE 200 (see FIG. 2), one or more AoP 246 may identify the received Voice Command 204 as a "keyword" such as by comparing the waveform of the received Voice Command 204 with Analog Voice Tag 404 of Keyword 1 402A. In an embodiment, Keyword 1 may have been heuristically determined to be a as "last voice command"—i.e. a voice command for which no additional voice commands are expected to follow. For such "last voice commands" Keyword 1 402A may include an identifier (not shown) indicating that Keyword 1 402A is a "last voice command" in some embodiments. In other embodiments, all of Keyword 1 402A—Keyword N 402N may be heuristically determined "last voice commands" in which case no separate identifier may be needed. Identifying Keyword 1 402A as a "last voice command" may be particularly beneficial if Keyword 1 402A requires a data transfer over a communication channel. Identifying a "last voice commend" after which no additional commands are expected indicates that the communication channel can be closed after the "last voice command" is executed without fear of needing to immediately open a new communication channel in response to further voice commands. AoP 246, acting on such a Keyword 1 402A, may automatically generate a fast dormancy command for the communication channel such that the UE 202 automatically closes the communication channel after the data transfer, further saving power.

Other context data that may be associated with and/or stored in association with a particular "keyword" such as Keyword 1 402A may also include a Time of Day 408 for Keyword 1 402A representing a time during the day that the Voice Command 204 "keyword" is given. For example, in some embodiments it may be determined that when a specific Voice Command 204 is given at a particular time of day (or at one general time of day versus another time of day) the Voice Command 204 may be a "last voice command." For such embodiments, associating the Time of Day 408 with Keyword 1 402A may allow a determination of Keyword 1 402A as a "last voice command." In other embodiments, the Time of Day 408 may just be another piece of the context data that AoP 246 uses to determine how to act when Keyword 1 402A is identified as a "keyword" for which full voice recognition decoding/processing may be by-passed.

Another example of the context data that may be associated with and/or stored in association with a particular "keyword" such as Keyword 1 402A is information about data that is requested by the "keyword," represented by Data Request 406. For example, if Keyword 1 402A has been determined to be a Voice Command for a specific data request, such as current weather conditions, current traffic conditions, a most recent score for an athletic team, etc., then the data request associated with the voice command may be stored as part of the context data as Data Request 406. Again, in some embodiments, associating the Data Request 406 with Keyword 1 402A may allow a determination of Keyword 1 402A as a "last voice command." In other embodiments, the Data Request 406 may just be another piece of the context data that AoP 246 uses to determine how to act when Keyword 1 402A is identified as a "keyword" for which full voice recognition decoding/processing may be by-passed.

Yet another example of the context data that may be associated with and/or stored in association with a particular "keyword" such as Keyword 1 402A is information about the radio configuration for a data communication associated with the "keyword," represented by Radio Config. 410. For example, if Keyword 1 402A has been determined to be a Voice Command 204 for a data request at a particular Time of Day 408, location, etc., where a particular communications method is available or preferred (such as Wi-Fi), then the radio configuration for the data request may be stored as part of the context data such that AoP 246 only wakes up the necessary communication component (e.g. Network Card 216) rather than waking up all of the possible communication components and/or waking up separate processors or components (such as GPS) to determine how the data request should be communicated from UE 200. In another embodiment, Radio Config. 410 may represent a last known communications configuration that should be tried first by AoP 246 before waking up separate processors or components that determine how the data request should be communicated from UE 200.

Another example of the context data that may be associated with and/or stored in association with a particular "keyword" such as Keyword 1 402A is a time stamp of the last time the same Analog Voice Tag 404 was matched (Last Match Timestamp 412) and/or the results of the last match with a timeout value for the results (LM Results/Timeout Value 414). In this manner, if Keyword 1 402A is associated with a data request for particular information that has been recently obtained by UE 200 using the same Keyword 1 402A, then the results of most recent or "last match" for Keyword 1 402A may be obtained by the AoP 246 from Keyword Cache 248 rather than waking up the full voice decoding/processing components, bringing up a modem and opening a new communication channel to re-acquire the information. In an embodiment the results of the last match will include a timeout value beyond which the information from the last match results is assumed to be stale such that the last match results are not used and the full voice recognition processing is not by-passed.

As will be understood, FIG. 4 is illustrative and more or less context data may be stored for a particular "keyword" than is shown in FIG. 4. As will also be understood, it is not necessary that each of Keyword 1 402A—Keyword N 402N have the same types of associated context data. In other words, Keyword 1 402A may have only have Analog Voice Packet/Tag 404 and Time of Day 408 as the associated context data, while a different "keyword" such as Keyword 2 402B may have Analog Voice Packet/Tag 404, Data Request 406, and Radio Config. 410 (or other combinations of) context data.

Figure 5:
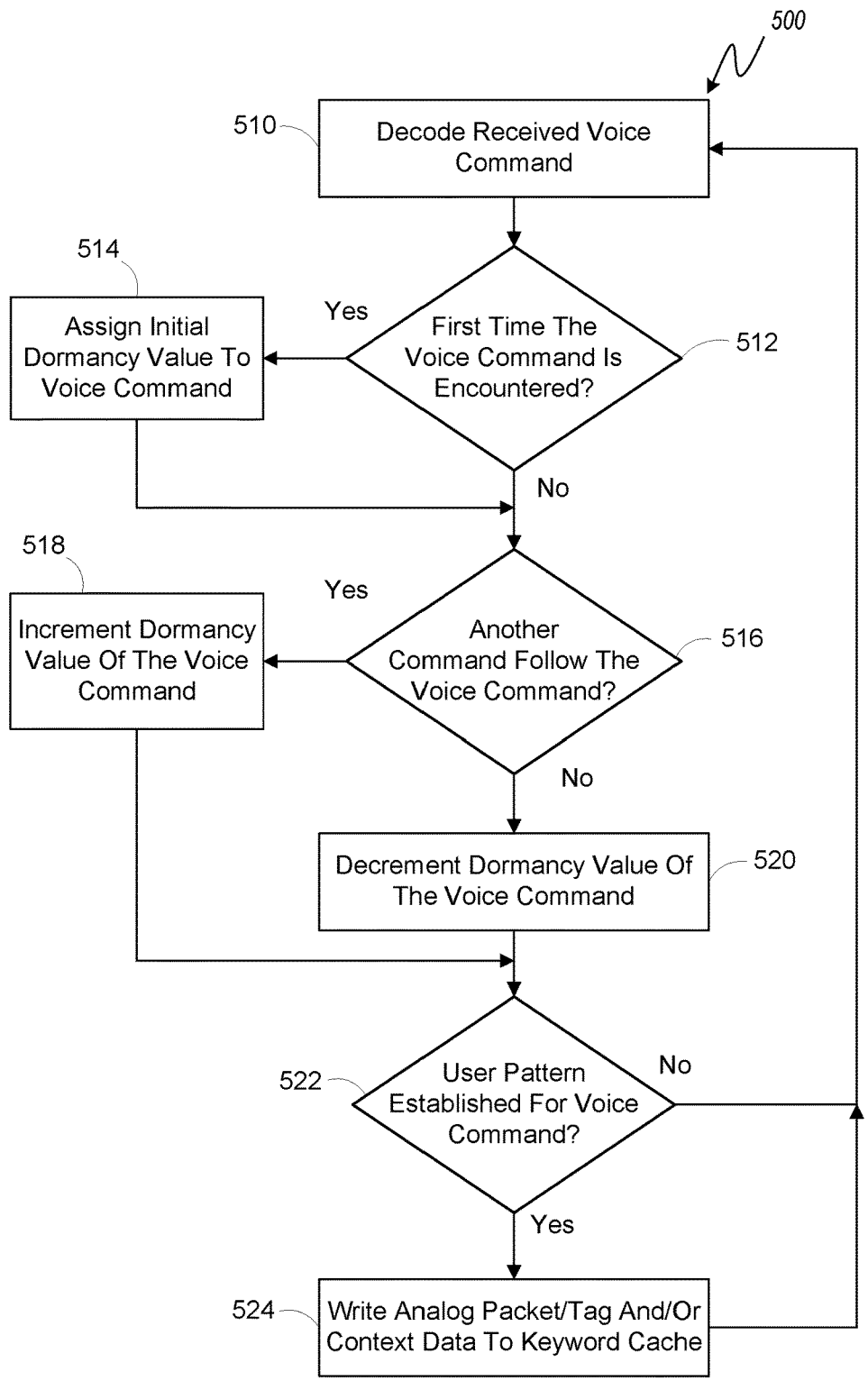
FIG. 5 is a logical flowchart illustrating the operation of an exemplary method for heuristically determining a keyword and/or context data for a keyword.

FIG. 5 is a logical flowchart illustrating the operation of an exemplary method 500 for heuristically determining a "keyword" and/or context data for a "keyword." Depending on the embodiment, the method 500 of FIG. 5 may be performed by Heuristic Logic 244 of SoC 202 (see FIG. 2) and/or Heuristic Logic 344 of Gateway 302 (see FIG. 3), in each case either acting alone or acting in conjunction with other components/hardware/software of SoC 202 (such as VR Decoder/Logic 242) or Gateway 302 (such as VR Decoder Logic/342), respectively. For simplicity, FIG. 5 will be discussed in the context of FIG. 2 where the heuristics are performed on UE 200. However, the below discussion is equally applicable to alternate embodiments such as FIG. 3 where some or all of the heuristics are performed external to UE 300, such as at Gateway 302.

Method 500 begins at block 510 where a received voice command, such as Voice Command of FIG. 2 is decoded. As discussed above in an embodiment, such voice recognition of a received Voice Command may be performed by any known method and may be performed by any desired component, such as VR Decoder/Logic 242 of VR Module 240 of FIG. 2. Once the Voice Command is decoded, a determination is made in block 512 whether the received Voice Command has been encountered before—e.g. whether this Voice Command has been previously decoded. The determination of block 512 may be made by Heuristic Logic 242, such as by checking a table or record of decoded Voice Commands stored at VR Module 240 or elsewhere on SoC 202.

If the determination in block 512 is that this is the first time a Voice Command has been encountered, method 500 continues to block 514 where an initial "dormancy value" is assigned to the Voice Command. In the embodiment of FIG. 5, method 500 is heuristically determining "keywords" that are "last voice commands"—i.e. Voice Commands that are not expected to have any additional Voice Commands following—in order to determine whether fast dormancy may be automatically applied after the Voice Command is executed. In other embodiments that are identifying other types of "keywords," other values may be assigned to the Voice Command.

In the embodiment of FIG. 5, the "dormancy value" represents an expectation that another command will follow the received Voice Command such that fast dormancy would not be appropriate after execution of the Voice Command. This "dormancy value" may be represented in any desired manner, such as an another_cmd_expected value expressing the expectation that another command will follow, which would be initially set to 100% in block 514. Alternately, the "dormancy value" may be represented as a fast_dormancy_entry value expressing the expectation that no command will follow such that fast dormancy is appropriate, which would be initially set to 0 in block 514.

Regardless of how expressed, after the initial Dormancy Value is set in block 514—or if the determination in block 512 is that the Voice Command has been encountered before—method 500 proceeds to block 516. In block 516, a determination is made whether another command follows the received Voice Command of block 510. If another command follows the received Voice Command method 500 continues to block 518 where the "dormancy value" is incremented. Alternatively, if the determination in block 516 is that another command does not follow the received Voice Command, method 500 continues to block 520 where the "dormancy value" is decremented.

By way of example, assume the "dormancy value" is expressed as another_cmd_expected (initial value 100%). If the determination in block 516 is that another command followed the received Voice Command of block 510, then the current value of another_cmd_expected would be increased/incremented in block 518. In an embodiment the value would only be increased/incremented in block 518 up to a pre-determined threshold value (which in an embodiment may be 100%). If the determination in block 516 is that another command did not follow the received Voice Command of block 510, then the current value of another_cmd_expected would be decreased/decremented in block 520. Note that the amount of increment/decrement may be fixed, or may vary as desired.

Method 500 continues to block 522 where a determination is made whether a user pattern has been established for the received Voice Command of block 510. In the embodiment of FIG. 5, this determination of block 522 may comprise a determination that the received Voice Command of block 510 is a "last voice command" that should be stored as a "keyword." In such embodiments, the determination of block 522 may be made by determining that the "dormancy value" has reached a pre-determined threshold. Continuing with the above example, the determination of block 522 in an embodiment may comprise a determination whether the current value of another_cmd_expected has dropped to or below a pre-determined percentage (e.g. 5%) such that a User Pattern of "last voice command" is established.

If the determination in block 522 is that a User Pattern is not established (e.g. the current value of another_cmd_expected is above 5% in the above example) method 500 returns to block 510 and waits for the next received Voice Command to be decoded. If the determination in block 522 is that a User Pattern is established (e.g. the current value of another_cmd_expected is at or below 5%) method 500 continues to block 524 where the "keyword" and any context data is stored. In the embodiment of FIG. 5, block 524 may comprise writing the "keyword" Analog Voice Packet/Tag 404 comprising a waveform for the received Voice Command (see FIG. 4), as well as any other desired context data associated with the "keyword" to a Keyword Cache 248 (see FIG. 2). Method 500 then returns to block 510 and waits for the next received Voice Command to be decoded.

Once one or more "keywords" and any associated context data have been identified and stored, the UE may then use these "keywords" to by-pass full voice recognition for certain Voice Commands and/or to automatically implement fast dormancy for certain Voice Commands saving power in the operation of the UE. This power savings may be especially beneficial to wearable UEs that have limited battery size/power and which typically are only voice controlled by a single user. However, these benefits are equally applicable to other UEs. An example method for such power savings may be accomplished is illustrated in FIG. 6.

Figure 6:
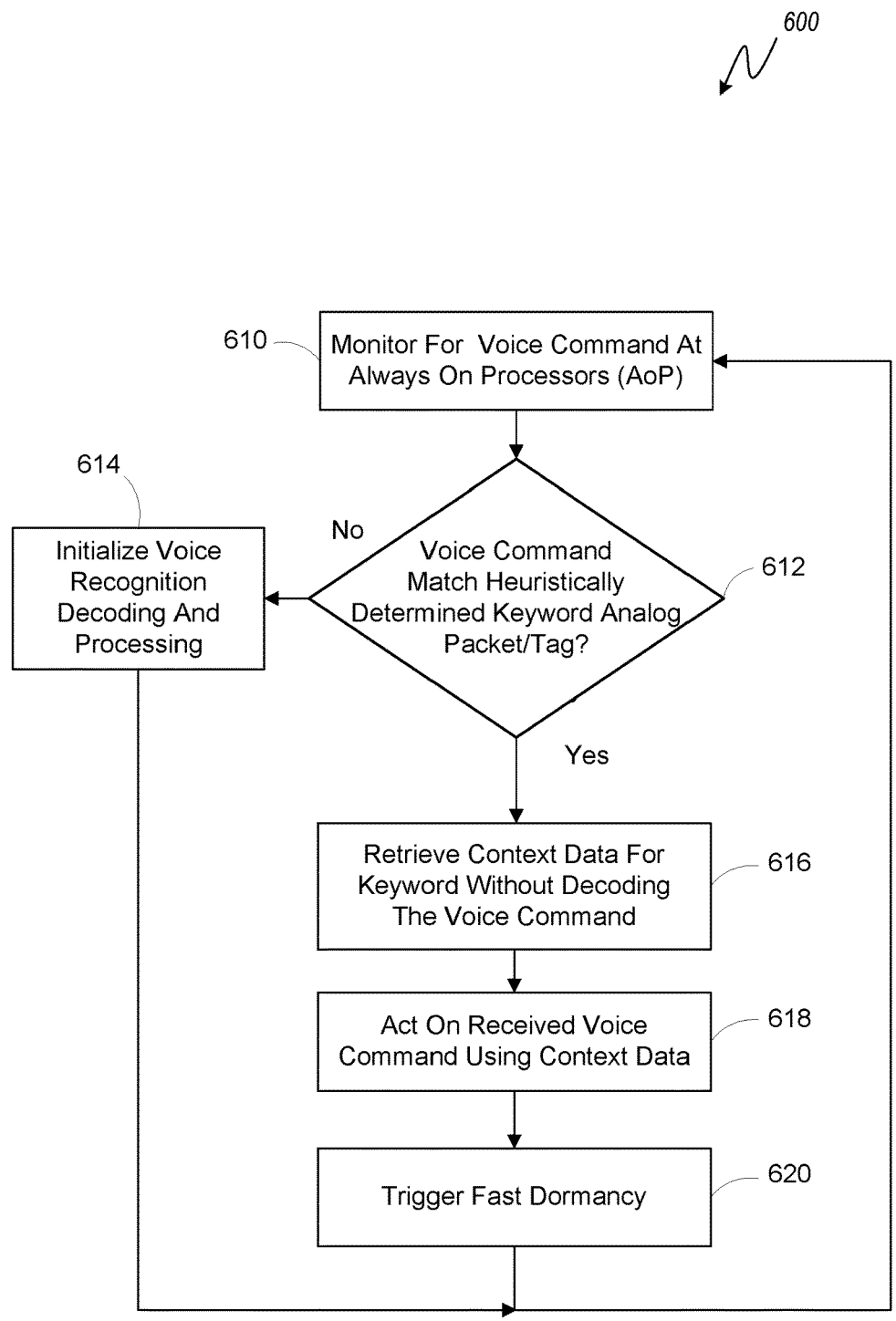
FIG. 6 is a logical flowchart illustrating the operation of an exemplary method for power savings in voice control of a PCD.

FIG. 6 is a logical flowchart illustrating the operation of an exemplary method 600 for power savings in voice control of a PCD such as UE 200 of FIG. 2 or UE 301 of FIG. 3. Depending on the embodiment, the method 600 of FIG. 6 may be performed by one or more AoP 246 in communication with Keyword Cache 248 with the AoP 246 either acting alone of acting in conjunction with other components/hardware/logic of VR Module 240 and/or SoC 202. For simplicity, FIG. 6 will be discussed in the context of UE 200 of FIG. 2. However, the below discussion is equally applicable to alternate embodiments such as FIG. 3.

Method 600 begins at block 610 where one or more AoP 246 monitors for voice commands, such as Voice Command received by Audio CODEC 250 in FIG. 2. Once a Voice Command is received at an AoP 246, a determination is made in block 612 whether the received Voice Command is one of the heuristically determined "keywords" (see FIG. 5). The determination in block 612 is made without the need to perform full voice recognition decoding and/or processing for the Voice Command, such as with VR Decoder/Logic 242. In an embodiment, the determination of block 612 comprises AoP 246 determining whether the waveform of the received Voice Command matches one of the Analog Voice Packet/Tag 404 of Keyword 1 402A (see FIG. 4) stored in a Keyword Cache 248 in communication with AoP 246 (see FIG. 2).

If the determination in block 612 is that the received Voice Command of block 610 does not match a heuristically determined "keyword," then method 600 continues to block 614 where full voice recognition and processing commences. Block 614 may comprise AoP 246 waking up one or more of VR Decoder/Logic 242, Model 260, Network Card 216, and/or one or more of the cores 122-126 to process the received Voice Command. Method 600 then returns to block 610 where the AoP(s) 246 continue to monitor for Voice Commands.

Returning to block 612, if the determination is that the received Voice Command of block 610 does match a heuristically determined "keyword," then method 600 continues to block 616 where any context data for the "keyword" is retrieved by AoP 246 without the need to perform full voice recognition and processing. The context data may include Data Request 406 information, Time of Day 408 information, Radio Config. 410 information, Last Match Timestamp 412 information, Last Match Results/Timeout Value 414 information, an indicator or other information that the "keyword" is a "last voice command," any other desired context information, or any combination thereof. This context data may be stored in association with the "keyword" in one or more Keyword Cache 248 in communication with AoP 246.

AoP 246 then acts on the received Voice Command using the context data associated with the "keyword" in block 618. As noted in the discussion of FIG. 4, the actions taken by the AoP 246 for a particular Voice Command may depend on the associated context data, and may include fulfilling a data request from the information stored in the Keyword Cache 248 if the stored information is not stale (rather than waking of a radio, establishing a communication channel, and retrieving the information); automatically waking up a particular communication component to establish a communication channel for a data transfer (without the need to wake up additional processors/components to determine a communication component); automatically performing a particular data request (rather than waking up additional components/logic to determine what data is requested by the Voice Command); etc.

As noted above for FIG. 5, in an embodiment, the heuristically determined "keywords" may all be determined "last voice command" for which additional commands are not expected to follow. In such embodiments, AoP 246 may also perform block 620 and automatically trigger or initiate fast dormancy after acting on the received Voice Command in block 618. In this manner, additional power savings may be gained by causing fast dormancy following Voice Commands that require a network connection where the Voice Commands have been heuristically determined based on a user's prior activity to be a "last voice command." Method 600 then returns to block 610 where the AoP(s) 246 continue to monitor for Voice Commands.

Method 600 may thus allow for bypassing typical voice recognition processing of typical systems when a received voice command is a previously and/or heuristically determined "keyword." For example, in an embodiment, a voice command of "how's traffic" at a particular time of day may have been previously determined, such as through method 500 of FIG. 5, to be a "last voice command" after which no further voice commands are expected, and stored as a "keyword" (along with any context data) such as in a Keyword Cache 248 (FIG. 2)

Continuing with the example, when this "how's traffic" voice command is received at a UE (such as UE 200 of FIG. 2), method 600 allows for the voice command to be matched to the stored "keyword" waveform/tag without the need to wake up voice recognition components and/or perform full voice recognition processing. Context data for the "keyword" may also be retrieved and the voice command may be acted on using the context data, again without the need to wake up voice recognition components and/or perform full voice recognition processing. Depending on the context data, additional power savings may be recognized as discussed above for FIG. 4, such as waking up a specific radio based on a Radio Config. 410 context data (FIG. 4) when acting on the voice command requires opening a communication channel. Additionally, method 600 also allows for fast dormancy to be automatically triggered as part of acting on the received voice command, further saving resources and power on the UE.

FIG. 5 describes only one exemplary embodiment of a method 500 for heuristically determining a "keyword" and/or context data for a "keyword" in a PCD such as UE 200 of FIG. 2 or EU 300 of FIG. 3. Similarly, FIG. 6 describes only one exemplary embodiment of a method 600 for 600 for power savings in voice control of a PCD such as UE 200 of FIG. 2 or EU 300 of FIG. 3. In other embodiments, additional blocks or steps may be added to methods 500 and/or 600. Similarly, in some embodiments various blocks or steps shown in FIG. 5 or 6 may be combined or omitted. Such variations of the methods 500 and 600 are within the scope of this disclosure.

Additionally, certain steps in the processes or process flows described in this specification naturally precede others for the invention to function as described. However, the disclosure is not limited to the order of the steps described if such order or sequence does not alter the functionality. Moreover, it is recognized that some steps may performed before, after, or in parallel (substantially simultaneously) with other steps without departing from the scope of this disclosure. In some instances, certain steps may be omitted or not performed without departing from the scope of the disclosure. Further, words such as "thereafter", "then", "next", "subsequently", etc. are not intended to limit the order of the steps. These words are simply used to guide the reader through the description of the exemplary methods 500 and 600.

The various operations and/or methods described above may be performed by various hardware and/or software component(s) and/or module(s), and such component(s) and/or module(s) may provide the means to perform such operations and/or methods. Additionally, one of ordinary skill in programming is able to write computer code or identify appropriate hardware and/or circuits to implement the disclosed method or system without difficulty based on the flow charts and associated description in this specification, for example.

Therefore, disclosure of a particular set of program code instructions or detailed hardware devices is not considered necessary for an adequate understanding of how to make and use the disclosed system or method. The inventive functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored on or transmitted as one or more instructions or code on a computer-readable medium, such as a non-transitory processor-readable medium. Computer-readable media include both data storage media and communication media including any medium that facilitates transfer of a program from one location to another.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and Blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the scope of the present disclosure, as defined by the following claims.

What is claimed is:

1. A method for controlling a portable computing device ("PCD"), the method comprising:
heuristically determining a keyword by:
receiving a voice command with heuristic logic;
assigning a dormancy value to the voice command;
determining a user pattern for the voice command based on the dormancy value;
storing an analog packet and the context data associated with the keyword in a keyword cache;
receiving the voice command at an always on processor (AoP) of a voice recognition module of the PCD;
determining, with the AoP, without decoding the received voice command, that the received voice command corresponds to the previously determined and stored keyword;
retrieving, with the AoP, context data associated with the previously determined keyword; and
acting on the voice command, with the AoP, using the context data.

2. The method of claim 1, wherein:
acting on the voice command using the context data comprises establishing a communication channel from the PCD to a remote network; and
wherein the method further comprises
triggering, with the AoP, fast dormancy for the communication channel.

3. The method of claim 1, wherein the context data includes one or more of a time of day, a data request, a radio configuration, a last match timestamp, and a last match results.

4. The method of claim 1, wherein the previously determined keyword comprises an analog packet stored in a keyword cache in communication with the AoP.

5. The method of claim 4, wherein determining that the received voice command corresponds to the heuristically determined keyword comprises matching a waveform of the received voice command to the analog packet stored in the keyword cache.

6. The method of claim 1, wherein assigning the dormancy value to the voice command further comprises:
determining whether an additional command follows the received voice command; and if no additional command follows the received voice command, then decrementing the dormancy value of the voice command.

7. A computer system controlling a portable computing device ("PCD"), the system comprising:
heuristic logic configured to heuristically determine a keyword by:
receiving a voice command with the heuristic logic;
assigning a dormancy value to the voice command;
determining a user pattern for the voice command based on the dormancy value; and
storing an analog packet and the context data associated with the keyword in a keyword cache;
a voice recognition (VR) module of the portable computing device, the VR module including an always on processor (AoP), the AoP configured to:
receive the voice command;
determine, without decoding, the received voice command that the received voice command corresponds to the previously determined keyword;
retrieve context data associated with the previously determined keyword; and
act on the voice command using the context data.

8. The computer system of claim 7, wherein:
acting on the voice command using the context data comprises establishing a communication channel from the PCD to a remote network; and
the AoP is further configured to trigger fast dormancy for the communication channel.

9. The computer system of claim 7, wherein the context data includes one or more of a time of day, a data request, a radio configuration, a last match timestamp, and a last match results.

10. The computer system of claim 7, wherein the VR module further comprises a keyword cache in communication with the AoP and wherein the previously determined keyword comprises an analog packet stored in the keyword cache.

11. The computer system of claim 10, wherein the AoP is furthered configured to determine that the received voice command corresponds to the previously determined keyword by matching a waveform of the received voice command to the analog packet stored in the keyword cache.

12. The computer system of claim 10, wherein the heuristic logic is further configured to assign the dormancy value to the voice command by:
determining whether an additional command follows the received voice command; and
if no additional command follows the received voice command, then decrementing the dormancy value of the voice command.

13. A computer program product comprising a non-transitory computer usable medium having a computer readable program code embodied therein, said computer readable program code adapted to be executed to implement a method for controlling a portable computing device ("PCD"), said method comprising:
heuristically determining a keyword by:
receiving a voice command with heuristic logic;
assigning a dormancy value to the voice command;
determining a user pattern for the voice command based on the dormancy value;
storing an analog packet and the context data associated with the keyword in a keyword cache;
receiving the voice command at an always on processor (AoP) of a voice recognition module of the PCD;
determining, with the AoP, without decoding the received voice command, that the received voice command corresponds to the previously determined and stored keyword;
retrieving, with the AoP, context data associated with the previously determined keyword; and
acting on the voice command, with the AoP, using the context data.

14. The computer program product of claim 13, wherein:
acting on the voice command using the context data comprises establishing a communication channel from the PCD to a remote network; and
the method further comprises triggering, with the AoP, fast dormancy for the communication channel.

15. The computer program product of claim 13, wherein the context data includes one or more of a time of day, a data request, a radio configuration, a last match timestamp, and a last match results.

16. The computer program product of claim 13, wherein the previously determined keyword comprises an analog packet stored in a keyword cache in communication with the AoP.

17. The computer program product of claim 13, wherein determining that the received voice command corresponds to the heuristically determined keyword comprises matching a waveform of the received voice command to the analog packet stored in the keyword cache.

18. The computer program product of claim 13, wherein assigning the dormancy value to the voice command comprises:
determining whether an additional command follows the received voice command; and
if no additional command follows the received voice command, then decrementing the dormancy value of the voice command.

* * * * *